(12) United States Patent
Togashi et al.

(10) Patent No.: US 6,999,300 B2
(45) Date of Patent: Feb. 14, 2006

(54) MULTILAYER CAPACITOR

(75) Inventors: Masaaki Togashi, Tokyo (JP); Taisuke Ahiko, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/081,613

(22) Filed: Mar. 17, 2005

(65) Prior Publication Data

US 2005/0207093 A1 Sep. 22, 2005

(30) Foreign Application Priority Data

Mar. 19, 2004 (JP) .............................. 2004-079536

(51) Int. Cl.
 *H01G 4/228* (2006.01)
(52) U.S. Cl. .............................. 361/306.3; 361/306.1; 361/321.2; 361/311
(58) Field of Classification Search ................ 361/303, 361/306.1, 306.3, 309, 308.1, 308.2, 311, 361/321.1, 321.2, 321.3, 330; 29/25.41, 29/25.42
See application file for complete search history.

(56) References Cited

U.S. PATENT DOCUMENTS 6,034,864 A * 3/2000 Naito et al. .............. 361/306.1
6,407,907 B1 * 6/2002 Ahiko et al. ............. 361/306.3

FOREIGN PATENT DOCUMENTS

| EP | 1085539 | * 12/2001 |
| JP | 7-326536 | 12/1995 |
| JP | 2001-189234 | 7/2001 |
| JP | 2001-284170 | 10/2001 |
| JP | 2003-59755 | 2/2003 |

* cited by examiner

*Primary Examiner*—Anthony Dinkins
(74) *Attorney, Agent, or Firm*—Oblon, Spivak, McClelland, Maier & Neustadt, P.C.

(57) ABSTRACT

A multilayer capacitor includes: a dielectric element; a plurality of first internal electrodes and a plurality of second internal electrodes alternately arranged in the dielectric element while being separated from each other by dielectric layers; a first outer columnar electrode extending from a surface of the dielectric element to reach the first internal electrode on an outermost layer; a second outer columnar electrode extending from the surface of the dielectric element to reach the second internal electrode on an outermost layer; a first inner columnar electrode connected to all the first internal electrodes and having a cross-sectional area larger than a cross-sectional area of each of the first and second outer columnar electrodes; a second inner columnar electrode connected to all the second internal electrodes and having a cross-sectional area larger than a cross-sectional area of each of the first and second outer columnar electrodes; first external electrodes arranged in an island form on the surface of the dielectric element to be connected to the first outer columnar electrode; and second external electrodes arranged in an island form on the surface of the dielectric element to be connected to the second outer columnar electrode. Therefore, it is possible to obtain a multilayer capacitor that realizes reduced total inductance with reduced manufacturing cost.

20 Claims, 4 Drawing Sheets

F I G. 1
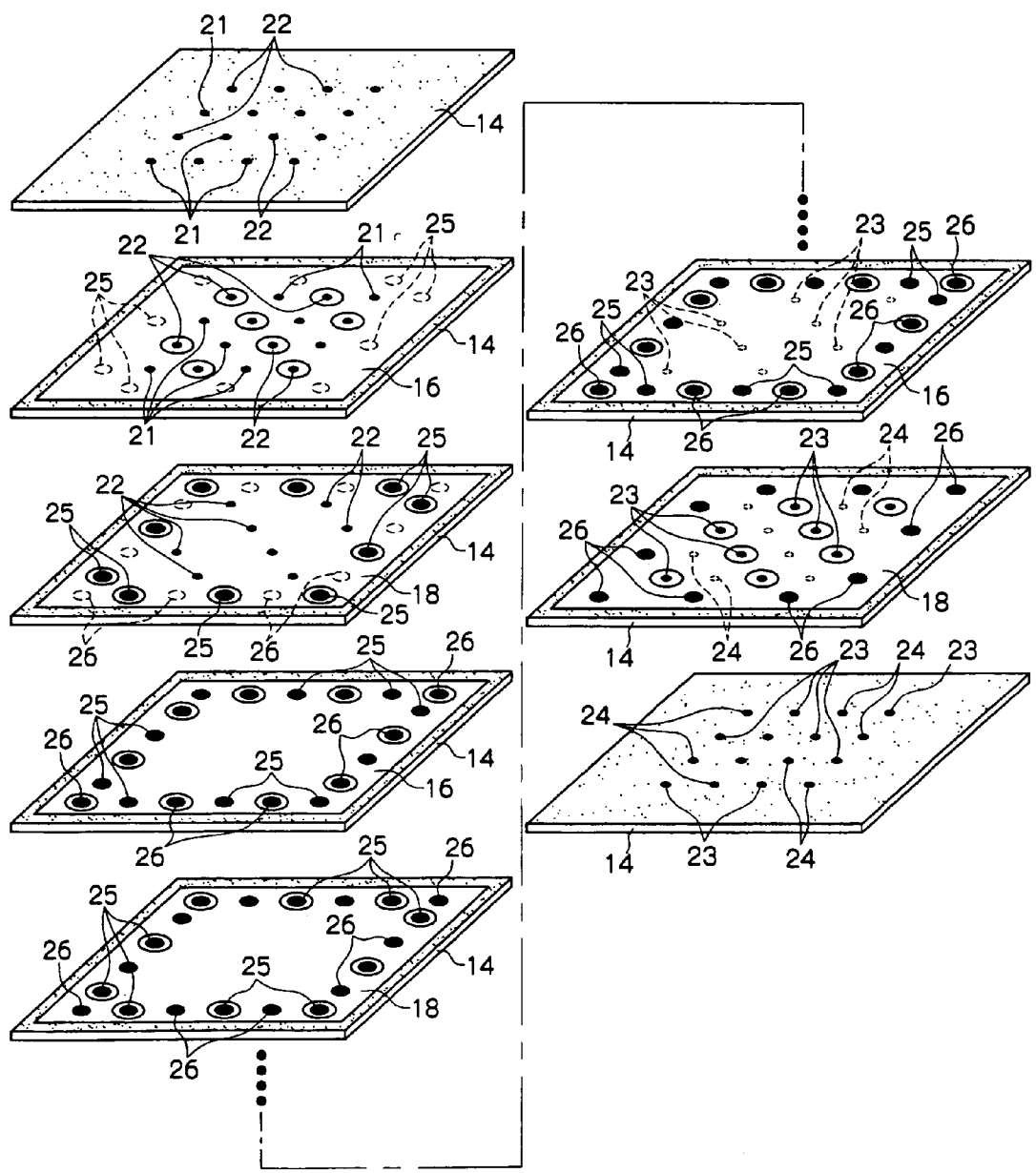

MULTILAYER CAPACITOR

BACKGROUND OF THE INVENTION

1. Field of the Invention

The present invention relates to a multilayer capacitor that realizes reduced total inductance with reduced manufacturing cost, and more particularly, to that suitable for use as a multilayer ceramic chip capacitor capable of reducing voltage fluctuation of a power source of a CPU.

2. Description of the Related Art

In recent years, due to an improved processing speed and a higher integration degree of a CPU (central processing unit) used for a data processor, its operating frequency is becoming higher and its current consumption is remarkably increasing. In accordance therewith, the operating voltage has been on the decreasing trend due to reduced power consumption. This has caused the occurrence of a higher-speed and larger current fluctuation in a power source for supplying power to the CPU, and it has become very difficult to control voltage fluctuation accompanying this current fluctuation, within an allowable value range of the power source.

Therefore, as a measure for stabilizing the power source, a multilayer capacitor as a smoothing capacitor is disposed in the vicinity of the CPU in the state of being connected to the power source and has come in frequent use. By quick charge/discharge at the time of a high-speed transient current fluctuation, the multilayer capacitor supplies a current to the CPU, thereby reducing the voltage fluctuation of the power source.

However, today's trend toward a still higher operating frequency of the CPU has resulted in higher-speed and larger current fluctuation, and consequently, equivalent series inductance (ESL) that the multilayer capacitor as a smoothing capacitor itself has become relatively large. As a result, total inductance including this equivalent series inductance gives a significant influence to the voltage fluctuation of the power source.

To solve this problem, as a structure of a conventional multilayer capacitor realizing reduced ESL, one disclosed in, for example, Japanese Patent Application Laid-open No. 2001-284170 (hereinafter, referred to as a patent document 1) is known. Specifically, this patent document 1 discloses a structure such that a plurality of terminal electrodes are disposed on each of four side faces of a multilayer capacitor in a rectangular parallelepiped shape, thereby realizing reduced ESL.

Further, Japanese Patent Application Laid-open No. 2001-189234, Japanese Patent Application Laid-open No. Hei 7-326536, and Japanese Patent Application Laid-open No. 2003-59755 (hereinafter, referred to as patent documents 2 to 4) disclose a multilayer capacitor adopting a structure such that external electrodes separated in an island form are disposed on at least one face out of upper and lower faces of the multilayer capacitor and the external electrodes are connected to internal electrodes by columnar through-hole electrodes. Specifically, in the inventions disclosed in the patent documents 2 to 4, the multilayer capacitor is directly connectable to pins serving as terminal electrodes disposed on a lower face side of a CPU, via these external electrodes, thereby reducing total inductance of a circuit having this multilayer capacitor.

However, in a multilayer capacitor in which a plurality of terminal electrodes are disposed on each of four side faces to be connected to the periphery of a CPU as in the patent document 1 described above, ESL cannot be sufficiently reduced, which has posed a limit on reduction in the total inductance.

On the other hand, a multilayer capacitor having external electrodes in an island form as in the patent documents 2 to 4 can respond to a higher speed of a CPU since total inductance is reduced. However, in manufacturing this multilayer capacitor, it has been necessary to produce a large number of slender through-holes inside the multilayer capacitor. This as a result makes the manufacture of the multilayer capacitor difficult, which has been a cause of increasing manufacturing cost.

SUMMARY OF THE INVENTION

In consideration of the above-described circumstances, it is an object of the present invention to provide a multilayer capacitor realizing reduced total inductance with reduced manufacturing cost.

According to one of the modes of the present invention, provided is a multilayer capacitor including: a dielectric element formed of a stack of dielectric layers; a plurality of first internal electrodes and a plurality of second internal electrodes both in a planar shape alternately arranged in the dielectric element while being separated from each other by the dielectric layers; a first outer columnar electrode extending from a surface of the dielectric element to reach the first internal electrode on an outermost layer; a second outer columnar electrode extending from the surface of the dielectric element to reach the second internal electrode on an outermost layer; a first inner columnar electrode which is connected to all the first internal electrodes while passing through the second internal electrodes and which has a cross-sectional area larger than a cross-sectional area of each of the first and second outer columnar electrodes; a second inner columnar electrode which is connected to all the second internal electrodes while passing through the first internal electrodes and which has a cross-sectional area larger than a cross-sectional area of each of the first and second outer columnar electrodes; first external electrodes arranged in an island form on the surface of the dielectric element to be connected to the first outer columnar electrode; and second external electrodes disposed in an island form on the surface of the dielectric element to be connected to the second outer columnar electrode.

The multilayer capacitor as structured above has the following operation.

According to the multilayer capacitor according to this mode, the plural first internal electrodes and the plural second internal electrodes each formed in the planar shape are alternately arranged in the dielectric element formed of a stack of the dielectric layers, while being separated from each other by the dielectric layers. Further, the first outer columnar electrode extends from the surface of the dielectric element to reach the first internal electrode on the outermost layer and is electrically connected to the first internal electrode. The second outer columnar electrode extends from the surface of the dielectric element to reach the second internal electrode on the outermost layer and is electrically connected to the second internal electrode.

The first inner columnar electrode and second inner columnar electrode each having the cross-sectional area larger than the cross-sectional area of each of these outer columnar electrodes are formed in the dielectric element. Out of them, the first inner columnar electrode is connected to all the first internal electrodes while passing through the second internal electrodes, and the second inner columnar electrode is connected to all the second internal electrodes while passing through the first internal electrodes. The first external electrodes arranged in the island form on the surface of the dielectric element are connected to the first outer columnar electrode, and the second external electrodes arranged in the island form on the surface of the dielectric element are connected to the second outer columnar electrode.

In short, in this mode, the first external electrodes are connected to the first inner columnar electrode via the first outer columnar electrode and the first internal electrode on the outermost layer, and are further connected to each of the other first internal electrodes via this first inner columnar electrode. Further, the second external electrodes are connected to the second inner columnar electrode via the second outer columnar electrode and the second internal electrode on the outermost layer, and are further connected to each of the other second internal electrodes via this second inner columnar electrode.

Therefore, according to the multilayer capacitor of this mode, the multilayer capacitor is directly connectable to terminal electrodes of a CPU by the external electrodes since the external electrodes in the island form are arranged on the surface of the dielectric element. Consequently, total inductance of a circuit having this multilayer capacitor is reduced, and as a result, it is possible to use the multilayer capacitor of this mode as a smoothing capacitor capable of responding to higher speed of the CPU. In other words, according to the invention of this mode, it is possible to obtain a multilayer capacitor capable of surely inhibiting voltage fluctuation of a power source and being optimum as a power source of a CPU.

Meanwhile, according to the invention of this mode, the connection among the plural first internal electrodes and the connection among the second internal electrodes are realized via the first and second inner columnar electrodes each having the cross-sectional area larger than the cross-sectional area of each of the first and second outer columnar electrodes connected to the first internal electrode and the second internal electrode on the outermost layers.

Consequently, it is possible to reduce faulty connection by substantially reducing the number of the columnar electrodes serving as through-hole electrodes, compared with that in a conventional example, and in addition, it is not necessary to make the through-hole electrodes, which will be formed inside the multilayer capacitor, more slender than necessary. This results in a multilayer capacitor with a low defect ratio, which facilitates manufacture thereof, so that manufacturing cost of the multilayer capacitor is reduced.

Meanwhile, as a modification example of the multilayer capacitor according to the aforesaid mode of the present invention, it is conceivable to add, besides the structure of this mode, a structure such that a diameter of each of the first inner columnar electrode and second inner columnar electrode is two to four times as large as a diameter of each of the first outer columnar electrode and second outer columnar electrode.

Therefore, according to this modification example, the same operation as that of the multilayer capacitor of the aforesaid mode of the present invention is obtained, and in addition, the cross-sectional area of each of the inner columnar electrodes is about four to sixteen times as large as the cross-sectional area of each of the outer columnar electrodes since the diameter of each of the inner columnar electrodes is two to four times as large as the diameter of each of the outer columnar electrodes. Consequently, even when the number of layers of the internal electrodes is increased with the intention of increasing capacitance, it is possible to more surely secure continuity among the plural first internal electrodes and among the plural second internal electrodes, so that functions as the multilayer capacitor can be surely exhibited. As a result, according to the multilayer capacitor of this modification example, it is possible to easily increase capacitance to a required size.

Moreover, as another modification example of the multilayer capacitor according to the aforesaid mode of the present invention, it is conceivable to add, besides the structure of this mode, a structure such that a diameter of each of the first inner columnar electrode and second inner columnar electrode is 150 $\mu$m to 200 $\mu$m, and a diameter of each of the first outer columnar electrode and second outer columnar electrode is 50 $\mu$m to 80 $\mu$m.

Therefore, according to this modification example, the same operation as that of the multilayer capacitor according to the aforesaid mode of the present invention is obtained, and in addition, the aforesaid operation and effect can be more surely achieved since the diameter of the inner columnar electrodes is specifically 150 $\mu$m to 200 $\mu$m and the diameter of the outer columnar electrodes is specifically 50 $\mu$m to 80 $\mu$m.

According to another mode of the present invention, provided is a multilayer capacitor including: a dielectric element formed of a stack of dielectric layers; a plurality of first internal electrodes and a plurality of second internal electrodes both in a planar shape alternately arranged in the dielectric element while being separated from each other by the dielectric layers; a first outer columnar electrode extending from a surface of the dielectric element to reach the first internal electrode on an outermost layer; a second outer columnar electrode extending from the surface of the dielectric element to reach the second internal electrode on an outermost layer; a first inner columnar electrode which is connected to all the first internal electrodes while passing through the second internal electrodes and which has a cross-sectional area larger than a cross-sectional area of each of the first and second outer columnar electrodes; a second inner columnar electrode which is connected to all the second internal electrodes while passing through the first internal electrodes and which has a cross-sectional area larger than a cross-sectional area of each of the first and second outer columnar electrodes; first external electrodes arranged in an island form on each of two surfaces of the dielectric element and connected to the first outer columnar electrode, the number of the first external electrodes on one of the two surfaces being different from the number of the first external electrodes on the other surface; and second external electrodes arranged in an island form on each of the two surfaces of the dielectric element and connected to the second outer columnar electrode, the number of the second external electrodes on one of the two surfaces being different from the number of the second external electrodes on the other surface.

The multilayer capacitor as structured above has the following operation.

The multilayer capacitor according to this mode includes the same structure as that of the multilayer capacitor of the aforesaid mode. In addition, it has the structure such that the first external electrodes and the second external electrodes are disposed on the two surfaces of the dielectric element, and the number of the first external electrodes and the number of the second external electrodes on one of the two surfaces of the dielectric element are different from those on the other surface of the dielectric element.

Therefore, the same operation as that of the multilayer capacitor according to the aforesaid mode is obtained, and in addition, when these external electrodes are disposed on each of the two surfaces of the dielectric element, the number of the outer columnar electrodes on one side of the dielectric element is made different from that on the other side of the dielectric element, and the number of the external electrodes on one of the two surfaces of the dielectric element is made different from that on the other surface of the dielectric element. Consequently, in a case where, for example, this multilayer capacitor is placed on an interposer board and a CPU is placed on an upper side of this multilayer capacitor, it is possible to easily respond to a case where the number and positions of pins of the interposer board are different from the number and positions of pins serving as terminal electrodes of the CPU.

According to still another mode of the present invention, provided is a multilayer capacitor including: a dielectric element formed of a stack of dielectric layers; a plurality of first internal electrodes and a plurality of second internal electrodes both in a planar shape alternately arranged in the dielectric element while being separated from each other by the dielectric layers; a first outer columnar electrode extending from a surface of the dielectric element to reach the first internal electrode on an outermost layer; a second outer columnar electrode extending from the surface of the dielectric element to reach the second internal electrode on an outermost layer; a first inner columnar electrode which is connected to all the first internal electrodes while passing through the second internal electrodes and which has a cross-sectional area larger than a cross-sectional area of each of the first and second outer columnar electrodes; a second inner columnar electrode which is connected to all the second internal electrodes while passing through the first internal electrodes and which has a cross-sectional area larger than a cross-sectional area of each of the first and second outer columnar electrodes; first external electrodes connected to the first outer columnar electrode; and second external electrodes connected to the second outer columnar electrode, wherein the first external electrodes and the second external electrodes are both arranged in an island form on the surface of the dielectric element while being adjacent to each other.

The multilayer capacitor as structured above has the following operation.

The multilayer capacitor according to this mode includes the same structure as that of the multilayer capacitor of the aforesaid mode. In addition, it has the structure such that the first external electrodes and the second external electrodes are disposed on the surface of the dielectric element to be arranged adjacent to each other.

Therefore, the same operation as that of the multilayer capacitor of the aforesaid mode is obtained, and in addition, since the plural first external electrodes and the plural second external electrodes are arranged adjacent to each other, magnetic fields are cancelled by each other due to high-frequency currents flowing in reverse directions from each other to reduce ESL, so that the effect of reducing total inductance is further enhanced.

BRIEF DESCRIPTION OF THE DRAWINGS

FIG. 1 is an exploded perspective view showing internal electrodes and through-hole electrodes of a multilayer capacitor according to a first embodiment of the present invention;

DETAILED DESCRIPTION OF THE PREFERRED EMBODIMENTS

Figure 2:
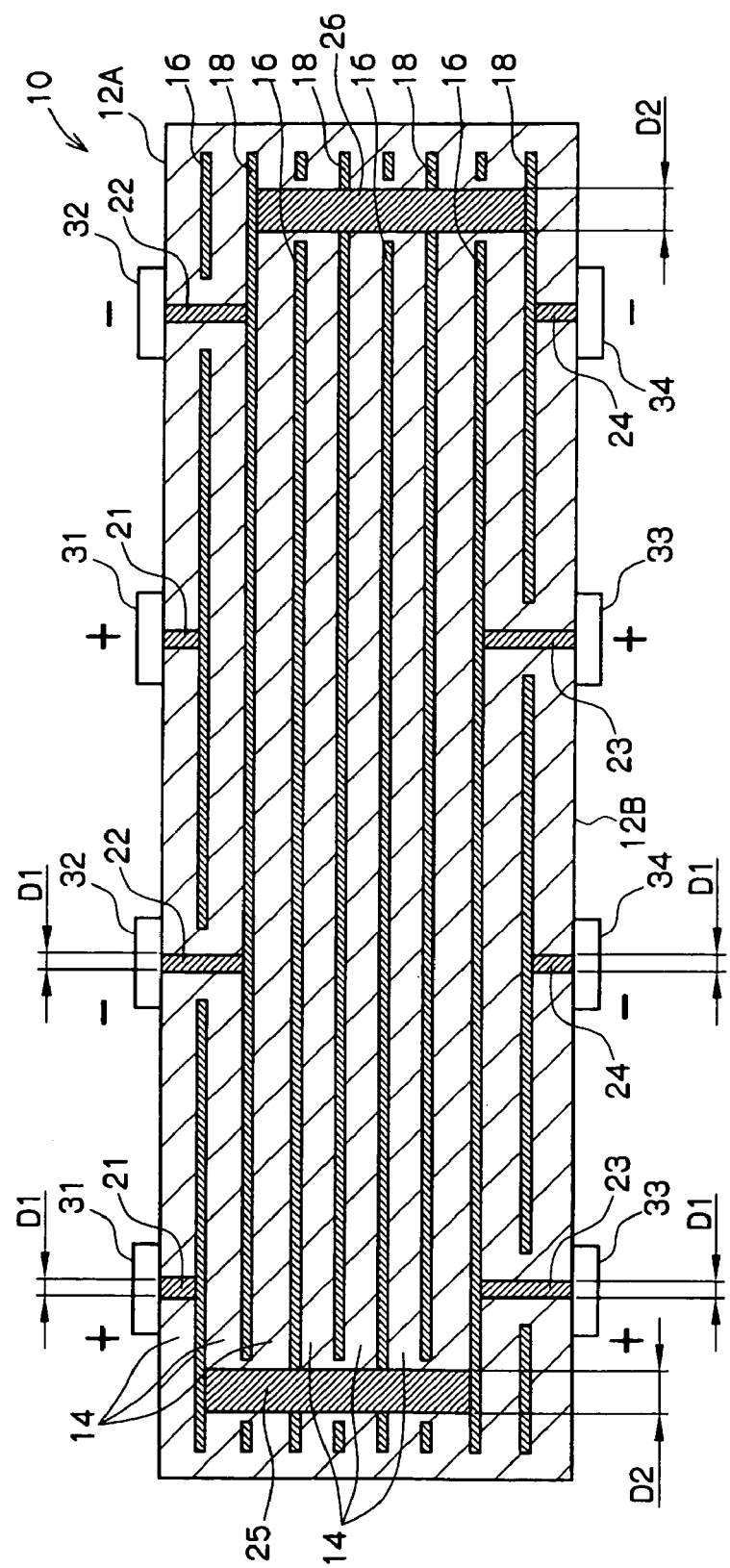
FIG. 2 is a cross-sectional view showing the multilayer capacitor according to the first embodiment of the present invention and is a view taken along the 2—2 line pointed by the arrows in FIG. 3.
Figure 3:
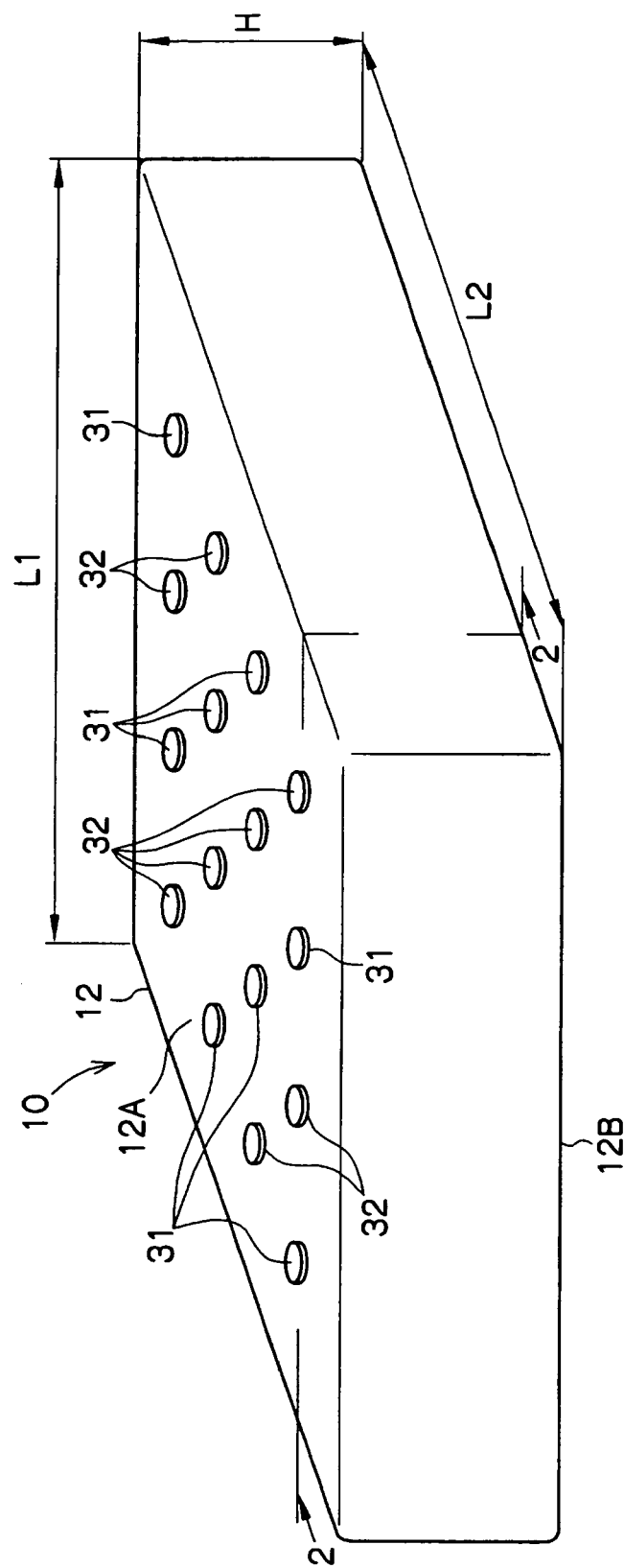
FIG. 3 is a perspective view showing the multilayer capacitor according to the first embodiment of the present invention.

FIG. 1 to FIG. 3 show a multilayer ceramic chip capacitor 10, which is a first embodiment of a multilayer capacitor according to the present invention, allowing three-dimensional mounting. As shown in these drawings, the multilayer ceramic chip capacitor (hereinafter, abbreviated to a multilayer capacitor) 10 according to this embodiment includes, as a main body portion thereof, a dielectric element 12 being a multilayer body in a rectangular parallelepiped shape that is obtained by sintering a stack of a plurality of ceramic green sheets which are dielectric sheets. Note that longitudinal and lateral dimensions L1, L2 of the dielectric element 12 shown in FIG. 3 are both, for example, 10 mm and a height dimension H is, for example, 0.85 mm.

As shown in FIG. 1 and FIG. 2, at a predetermined height position in the dielectric element 12, an internal electrode 16 in a planar shape which is a first internal electrode is disposed. In the dielectric element 12, an internal electrode 18 also in a planar shape which is a second internal electrode is disposed under the internal electrode 16 across a ceramic layer 14 which is a dielectric layer. Thereafter, in the same manner, a plurality of internal electrodes 16 and a plurality of internal electrodes 18 are alternately arranged while being separated from each other by ceramic layers 14 in the dielectric element 12.

The centers of the internal electrodes 16 and internal electrodes 18 are substantially aligned with the center of the dielectric element 12. Further, longitudinal and lateral dimensions of the internal electrodes 16 and the internal electrodes 18 are slightly smaller than the lengths of corresponding sides of the dielectric element 12. Therefore, end portions of the internal electrodes 16 and internal electrodes 18 do not face end portions of the dielectric element 12.

As shown in FIG. 1 and FIG. 2, a plurality of through-hole electrodes 21 and a plurality of through-hole electrodes 22 in a columnar shape are provided in the vicinity of the center in an upper portion in the dielectric element 12, extending so as to intersect the internal electrodes 16, 18 perpendicularly. A plurality of through-hole electrodes 23 and a plurality of through-hole electrodes 24 both also in a columnar shape are provided in the vicinity of the center in an lower portion in the dielectric element 12, extending so as to intersect the internal electrodes 16, 18 perpendicularly.

The through-hole electrodes 21 and the through-hole electrodes 22 are alternately arranged. Note that the through-hole electrodes 21 extend from an upper surface 12A of the dielectric element 12 to reach the internal electrode 16 on an upper outermost layer to be electrically connected to this internal electrode 16. Further, the through-hole electrodes 22 extend from the upper surface 12A of the dielectric element 12, passing through the internal electrode 16 on the upper outermost layer without being in contact therewith to reach the internal electrode 18 on an upper outermost layer, so that the through-hole electrodes 22 are electrically connected to this internal electrode 18.

Meanwhile, the through-hole electrodes 23 and the through-hole electrodes 24 are arranged alternately. Note that the through-hole electrodes 23 extend from a lower surface 12B of the dielectric element 12, passing through the internal electrode 18 on a lower outermost layer without being in contact therewith to reach the internal electrode 16 on a lower outermost layer, so that the through-hole electrodes 23 are electrically connected to this internal electrode 16. Further, the through-hole electrodes 24 extend from the lower surface 12B of the dielectric element 12 to reach the internal electrode 18 on a lower outermost layer, so that the through-hole electrodes 24 are electrically connected to this internal electrode 18.

As shown in FIG. 2 and FIG. 3, a plurality of external electrodes 31 in an island form which are first external electrodes are disposed on the upper surface 12A of the dielectric element 12, and these external electrodes 31 are electrically connected to the through-hole electrodes 21 respectively. Further, a plurality of external electrodes 32 in an island form which are second external electrodes are similarly disposed on the upper surface 12A, and these external electrodes 32 are electrically connected to the through-hole electrodes 22 respectively.

Meanwhile, on the lower surface 12B of the dielectric element 12, a plurality of external electrodes 33 in an island form which are also the first external electrodes are disposed, and these external electrodes 33 are electrically connected to the through-hole electrodes 23 respectively. Further, a plurality of external electrode 34 in an island form which are also the second external electrodes are similarly disposed on the lower surface 12B, and these external electrodes 34 are electrically connected to the through-hole electrodes 24 respectively.

Therefore, as shown in FIG. 1 and FIG. 2, in the vicinity of the center in the upper portion in the dielectric element 12, there exist a plurality of parallel arrays in each of which the through-hole electrodes 21 and the through-hole electrodes 22 are alternately arranged, and the arrangements in the adjacent arrays are reverse to each other. Further, in the vicinity of the center in the lower portion in the dielectric element 12, there exist a plurality of parallel arrays in each of which the through-hole electrodes 23 and the through-hole electrodes 24 are alternately arranged, and the arrangements in the adjacent arrays are reverse to each other.

Accordingly, as shown in FIG. 2 and FIG. 3, the external electrodes 31, 32 and the electrodes 33, 34 are disposed respectively on the upper and lower surfaces 12A, 12B of the dielectric element 12 in a hexahedron shape which is a rectangular parallelepiped shape. Due to the positional relation of the through-hole electrodes 21, 22, the plural external electrodes 31 and the plural external electrodes 32 are alternately arranged in a zigzag form on the upper surface 12A of the dielectric element 12, while being arranged adjacent to each other. Further, due to the positional relation of the through-hole electrodes 23, 24, the plural external electrodes 33 and the plural external electrodes 34 are alternately arranged in a zigzag form on the lower surface 12B of the dielectric element 12, while being arranged adjacent to each other.

As shown in FIG. 1 and FIG. 2, a plurality of columnar through-hole electrodes 25 connected to all the plural internal electrodes 16 while passing through the internal electrodes 18 without being in contact therewith are disposed at places in the dielectric element 12 on an outer peripheral side of a portion where the through-hole electrodes 21 to 24 are disposed, extending to intersect the internal electrodes 16, 18. Note that the through-hole electrodes 25 do not extend beyond the internal electrodes 16 on the outermost layers, so that they do not reach the upper and lower surfaces 12A, 12B of the dielectric element 12.

Similarly, a plurality of columnar through-hole electrodes 26 connected to all the plural internal electrodes 18 while passing through the internal electrodes 16 without being in contact therewith are disposed at places in the dielectric element 12 on the outer peripheral side of the portion where the through-hole electrodes 21 to 24 are disposed, extending to intersect the internal electrodes 16, 18. Note that the through-hole electrodes 26 do not extend beyond the internal electrodes 18 on the outermost layers, so that they do not reach the upper and lower surfaces 12A, 12B of the dielectric element 12.

In this structure, the through-hole electrodes 25, 26 are formed to have a cross-sectional area larger than the cross-sectional area of each of the through-hole electrodes 21 to 24, and the cross-sectional area of each of the through-hole electrodes 25, 26 is four to sixteen times as large as the cross-sectional area of each of the through-hole electrodes 21 to 24. Therefore, since each of the cross sections thereof is circular, a diameter D2 of each of the through-hole electrodes 25, 26 is two to four times as large as a diameter D1 of each of the through-hole electrodes 21 to 24. More specifically, the diameter D2 of each of the through-hole electrodes 25, 26 falls within a range of 150 $\mu$m to 200 $\mu$m, and the diameter D1 of each of the through-hole electrodes 21 to 24 falls within a range of 50 $\mu$m to 80 $\mu$m.

In this embodiment described above, the through-hole electrodes 21, 23 connected to the internal electrodes 16 which are the first internal electrodes serve as first outer columnar electrodes, and the through-hole electrodes 22, 24 connected to the internal electrodes 18 which are the second internal electrodes serve as second outer columnar electrodes. Similarly, the through-hole electrodes 25 connected to the internal electrodes 16 serve as first inner columnar electrodes, and similarly, the through-hole electrodes 26 connected to the internal electrodes 18 serve as second inner columnar electrodes.

Meanwhile, for example, when the multilayer capacitor 10 of this embodiment is to be used, the multilayer capacitor 10 is placed on a not-shown interposer board, a CPU, which is not shown either, is placed on an upper side of this multilayer capacitor 10, and the resultant structure is mounted on a typical circuit board. At this time, the external electrodes adjacent to each other are used in opposite polarities. As shown in FIG. 2, the external electrodes 31 and the external electrodes 33 have the same polarity, for example, the positive polarity, and similarly the external electrodes 32 and the external electrodes 34 have the same polarity, for example, the negative polarity. However, since high-frequency current generally flows in this multilayer capacitor 10, the polarity is reversed at the next moment.

Next, the operation of the multilayer capacitor 10 according to this embodiment will be described.

According to the multilayer capacitor 10 of this embodiment, the plural internal electrodes 16 and the plural internal electrodes 18 both formed in a planar shape are alternately arranged in the dielectric element 12 formed of a stack of the ceramic layers 14 which are dielectric layers, while being separated from each other by the ceramic layers 14.

Further, the through-hole electrodes 21 extend from the upper surface 12A of the dielectric element 12 to reach the internal electrode 16 on the upper outermost layer out of the plural internal electrodes 16, so that the through-hole electrodes 21 are electrically connected to this internal electrode 16. Similarly, the through-hole electrodes 22 extend from the upper surface 12A of the dielectric element 12 to reach the internal electrode 18 on the upper outermost layer out of the plural internal electrodes 18, so that the through-hole electrodes 22 are electrically connected to this internal electrode 18. Further, the through-hole electrodes 23 extend from the lower surface 12B of the dielectric element 12 to reach the internal electrode 16 on the lower outermost layer out of the plural internal electrodes 16, so that the through-hole electrodes 23 are electrically connected to this internal electrode 16. Similarly, the through-hole electrodes 24 extend from the lower surface 12B of the dielectric element 12 to reach the internal electrode 18 on the lower outermost layer out of the plural internal electrodes 18, so that the through-hole electrodes 24 are electrically connected to this internal electrode 18.

Meanwhile, the through-hole electrodes 25 and the through-hole electrodes 26 each having a cross-sectional area larger than a cross-sectional area of each of the through-hole electrodes 21 to 24 are formed in the dielectric element 12. Out of them, the through-hole electrodes 25 are connected to all the internal electrodes 16 while passing through the internal electrodes 18, and the through-hole electrodes 26 are connected to all the internal electrodes 18 while passing through the internal electrodes 16.

Further, the external electrodes 31 arranged in an island form on the upper surface 12A of the dielectric element 12 are connected to the through-hole electrodes 21, and the external electrodes 32 arranged in an island form on the upper surface 12A of the dielectric element 12 are connected to the through-hole electrodes 22. Further, the external electrodes 33 arranged in an island form on the lower surface 12B of the dielectric element 12 are connected to the through-hole electrodes 23, and the external electrode 34 arranged in an island form on the lower surface 12B of the dielectric element 12 are connected to the through-hole electrodes 24.

In short, in this embodiment, the external electrodes 31 disposed on the upper surface 12A of the dielectric element 12 are connected to the through-hole electrodes 25 via the through-hole electrodes 21 and the internal electrode 16 on the upper outermost layer, and the through-hole electrodes 25 are further connected to each of the other internal electrodes 16. Further, the external electrodes 33 disposed on the lower surface 12B of the dielectric element 12 are similarly connected to the through-hole electrodes 25 via the through-hole electrodes 23 and the internal electrode 16 on the lower outermost layer. Accordingly, the external electrodes 31, 33 have, for example, the positive polarity as shown in FIG. 2, so that the internal electrodes 16, the through-hole electrodes 21, and the through-hole electrodes 25 also have the positive polarity.

Meanwhile, the external electrodes 32 disposed on the upper surface 12A of the dielectric element 12 are connected to the through-hole electrodes 26 via the through-hole electrodes 22 and the internal electrode 18 on the upper outermost layer, and the through-hole electrodes 26 are further connected to each of the other internal electrodes 18. Further, the external electrodes 34 disposed on the lower surface 12B of the dielectric element 12 are similarly connected to the through-hole electrodes 26 via the through-hole electrodes 24 and the internal electrode 18 on the lower outermost layer. Accordingly, the external electrodes 32, 34 have, for example, the negative polarity as shown in FIG. 2, so that the internal electrodes 18, the through-hole electrodes 22, and the through-hole electrodes 26 also have the negative polarity.

Therefore, according to the multilayer capacitor 10 of this embodiment, the multilayer capacitor 10 is directly connectable to pins being terminal electrodes of a CPU by these external electrodes 31, 32 since the external electrodes 31, 32 in an island form are disposed on the upper surface 12A of the dielectric element 12. Consequently, total inductance of a circuit having this multilayer capacitor 10 is reduced, which as a result allows the multilayer capacitor 10 of this embodiment to be used as a smoothing capacitor capable of responding to a higher speed of the CPU. In other words, according to this embodiment, a multilayer capacitor capable of surely reducing voltage fluctuation of a power source and being optimum as a power source of a CPU can be obtained.

According to this embodiment, the connection among the plural internal electrodes 16 and the connection among the plural internal electrodes 18 are realized via the through-hole electrodes 25, 26 each of which has a cross-sectional area larger than a cross-sectional area of each of the through-hole electrodes 21 to 24 connected to the internal electrode 16 on the outermost layers and the internal electrode 18 on the outermost layers respectively.

Therefore, it is possible to reduce faulty connection by substantially reducing the number of the through-hole electrodes compared with that in the conventional example, and in addition, it is not necessary to make the through-hole electrodes, which will be formed inside the multilayer capacitor 10, more slender than necessary. This results in the multilayer capacitor 10 with a low defect ratio, which facilitates manufacturing thereof, so that manufacturing cost of the multilayer capacitor 10 is reduced.

In this embodiment, the diameter D2 of each of the through-hole electrodes 25, 26 is two to four times as large as the diameter D1 of each of the through-hole electrodes 21 to 24, so that the cross-sectional area of each of the through-hole electrodes 25, 26 is about four to sixteen times as large as the cross-sectional area of each of the through-hole electrodes 21 to 24. Consequently, even when the number of layers of the internal electrodes 16, 18 is increased with the intention of increasing capacitance, it is possible to more surely secure continuity among the plural internal electrodes 16 and among the plural internal electrodes 18, so that functions as the multilayer capacitor can be surely exhibited. As a result, according to this embodiment, it is possible to easily increase the capacitance to a required size.

Moreover, in this embodiment, the plural external electrodes 31 and the plural external electrodes 32 are disposed on the upper surface 12A of the dielectric element 12 to be arranged adjacent to each other. Consequently, on the upper surface 12A, magnetic fields are cancelled with each other by high-frequency currents flowing in reverse directions, so that an effect of reducing ESL is enhanced. Similarly, the plural external electrodes 33 and the plural external electrodes 34 are disposed on the lower surface 12B of the dielectric element 12 to be arranged adjacent to each other. Consequently, the effect of reducing ESL can be similarly enhanced also on the lower surface 12B.

Figure 4:
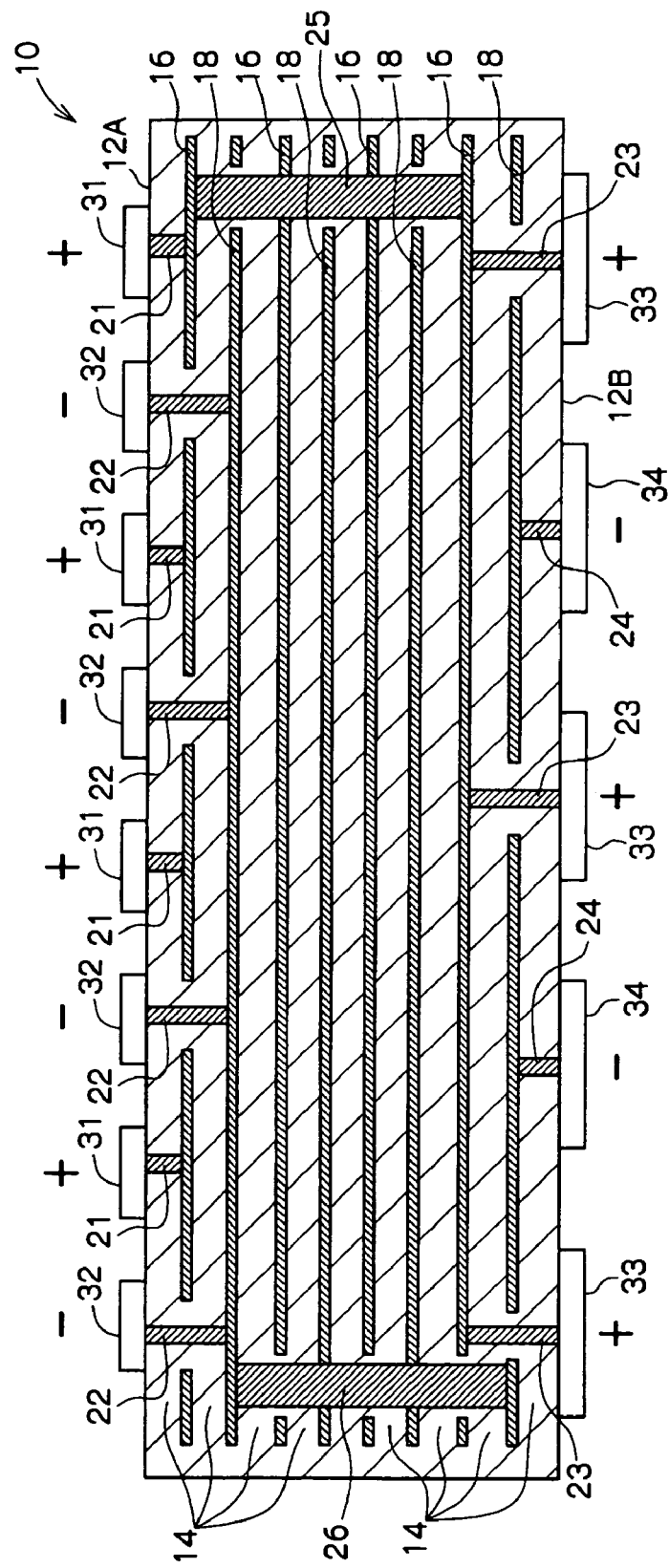
FIG. 4 is a cross-sectional view showing a multilayer capacitor according to a second embodiment of the present invention.

Next, a second embodiment of the multilayer capacitor according to the present invention will be shown in FIG. 4, and this embodiment will be described based on this drawing. The same reference numerals or symbols are used to designate the same members as the members described in the first embodiment, and repeated description thereof will not be given.

Also in this embodiment, external electrodes 31, 32 and external electrodes 33, 34 are disposed on two surfaces 12A, 12B of the dielectric element 12 respectively as in the first embodiment. However, in this embodiment, the number of the external electrodes 31, 32 on the upper layer 12A is different from the number of the external electrodes 33, 34 on the lower surface 12B as shown in FIG. 4. Specifically, eight times of eight external electrodes 31, 32 shown in FIG. 4, that is, totally 64 external electrodes 31, 32 are disposed on the upper surface 12A. Further, five times of five external electrodes 33, 34 also shown in FIG. 4, that is, totally 25 external electrodes 33, 34 are disposed on the lower surface 12B.

Therefore, when the external electrodes 31, 32 and 33, 34 are disposed on the both surfaces 12A, 12B of the dielectric element 12 respectively, the number of the through-hole electrodes 21, 22 on the upper surface 12A side of the dielectric element 12 is made different from the number of the through-hole electrodes 23, 24 on the lower surface 12B side, so that the number of the external electrodes 31, 32 on the upper surface 12A is made different from the number of the external electrodes 33, 34 on the lower surface 12B. As a result, in a case where the multilayer capacitor 10 is placed on an interposer board and a CPU is placed on the upper side of this multilayer capacitor 10, it is possible to easily respond to a case where the number and positions of pins of the interposer board are different from the number and positions of pins being terminal electrodes of the CPU.

Incidentally, the multilayer capacitor 10 according to the embodiments described above has about eight sheets of the internal electrodes, and has about 16, 25, or 64 pieces of the external electrodes per one surface. However, the number of the internal electrodes and the number of the external electrodes are not limited to these numbers. It is conceivable to provide, for example, about 50 sheets of the internal electrodes, but a larger number of the internal electrodes may be provided.

According to the present invention, it is possible to obtain a multilayer capacitor realizing reduced total inductance with reduced manufacturing cost. Further, the present invention is especially suitable as a multilayer ceramic chip capacitor capable of reducing voltage fluctuation of a power source of a CPU.

What is claimed is:

1. A multilayer capacitor comprising:
   a dielectric element formed of a stack of dielectric layers;
   a plurality of first internal electrodes and a plurality of second internal electrodes both in a planar shape alternately arranged in the dielectric element while being separated from each other by the dielectric layers;
   a first outer columnar electrode extending from a surface of the dielectric element to reach the first internal electrode on an outermost layer;
   a second outer columnar electrode extending from the surface of the dielectric element to reach the second internal electrode on an outermost layer;
   a first inner columnar electrode which is connected to all the first internal electrodes while passing through the second internal electrodes and which has a cross-sectional area larger than a cross-sectional area of each of the first and second outer columnar electrodes;
   a second inner columnar electrode which is connected to all the second internal electrodes while passing through the first internal electrodes and which has a cross-sectional area larger than a cross-sectional area of each of the first and second outer columnar electrodes;
   first external electrodes arranged in an island form on the surface of the dielectric element to be connected to the first outer columnar electrode; and
   second external electrodes arranged in an island form on the surface of the dielectric element to be connected to the second outer columnar electrode.

2. The multilayer capacitor according to claim 1, wherein a diameter of each of the first inner columnar electrode and second inner columnar electrode is two to four times as large as a diameter of each of the first outer columnar electrode and second outer columnar electrode.

3. The multilayer capacitor according to claim 1, wherein a diameter of each of the first inner columnar electrode and second inner columnar electrode is 150 $\mu$m to 200 $\mu$m, and a diameter of each of the first outer columnar electrode and second outer columnar electrode is 50 $\mu$m to 80 $\mu$m.

4. The multilayer capacitor according to claim 1,
   wherein the plural first outer columnar electrodes and the plural second outer columnar electrodes are provided, and
   wherein the first external electrodes in the number corresponding to the number of the first outer columnar electrodes are disposed on the surface of the dielectric element, and the second external electrodes in the number corresponding to the number of the second outer columnar electrodes are disposed on the surface of the dielectric element.

5. The multilayer capacitor according to claim 1, wherein the plural first inner columnar electrodes and the plural second inner columnar electrodes are provided in the dielectric element.

6. The multilayer capacitor according to claim 1, wherein the plural first inner columnar electrodes are disposed around the first outer columnar electrode on the first internal electrode, and the plural second inner columnar electrodes are disposed around the second outer columnar electrode on the second internal electrode.

7. The multilayer capacitor according to claim 1, wherein each of the dielectric layers is a ceramic layer made of a sintered ceramic green sheet.

8. The multilayer capacitor according to claim 1, wherein the first internal electrodes and the second internal electrodes each formed in the planar shape are disposed in substantially centers of the respective dielectric layers.

9. A multilayer capacitor comprising:
   a dielectric element formed of a stack of dielectric layers;
   a plurality of first internal electrodes and a plurality of second internal electrodes both in a planar shape alternately arranged in the dielectric element while being separated from each other by the dielectric layers;
   a first outer columnar electrode extending from a surface of the dielectric element to reach the first internal electrode on an outermost layer;
   a second outer columnar electrode extending from the surface of the dielectric element to reach the second internal electrode on an outermost layer;
   a first inner columnar electrode which is connected to all the first internal electrodes while passing through the second internal electrodes and which has a cross-sectional area larger than a cross-sectional area of each of the first and second outer columnar electrodes;
   a second inner columnar electrode which is connected to all the second internal electrodes while passing through the first internal electrodes and which has a cross-sectional area larger than a cross-sectional area of each of the first and second outer columnar electrodes;

first external electrodes arranged in an island form on each of two surfaces of the dielectric element and connected to the first outer columnar electrode, the number of the first external electrodes on one of the two surfaces being different from the number of the first external electrodes on the other surface; and second external electrodes arranged in an island form on each of the two surfaces of the dielectric element and connected to the second outer columnar electrode, the number of the second external electrodes on one of the two surfaces being different from the number of the second external electrodes on the other surface.

10. The multilayer capacitor according to claim 9, wherein a diameter of each of the first inner columnar electrode and second inner columnar electrode is two to four times as large as a diameter of each of the first outer columnar electrode and second outer columnar electrode.

11. The multilayer capacitor according to claim 9, wherein a diameter of each of the first inner columnar electrode and second inner columnar electrode is 150 $\mu$m to 200 $\mu$m, and a diameter of each of the first outer columnar electrode and second outer columnar electrode is 50 $\mu$m to 80 $\mu$m.

12. The multilayer capacitor according to claim 9,
wherein the plural first outer columnar electrodes and the plural second outer columnar electrode are provided, and wherein the first external electrodes in the number corresponding to the number of the first outer columnar electrodes are disposed on the surface of the dielectric element, and the second external electrodes in the number corresponding to the number of the second outer columnar electrodes are disposed on the surface of the dielectric element.

13. The multilayer capacitor according to claim 9, wherein the plural first inner columnar electrodes and the plural second inner columnar electrodes are provided in the dielectric element.

14. The multilayer capacitor according to claim 9, wherein the plural first inner columnar electrodes are disposed around the first outer columnar electrode on the first internal electrode, and the plural second inner columnar electrodes are disposed around the second outer columnar electrode on the second internal electrode.

15. A multilayer capacitor comprising:
a dielectric element formed of a stack of dielectric layers;
a plurality of first internal electrodes and a plurality of second internal electrodes both in a planar shape alternately arranged in the dielectric element while being separated from each other by the dielectric layers;
a first outer columnar electrode extending from a surface of the dielectric element to reach the first internal electrode on an outermost layer;
a second outer columnar electrode extending from the surface of the dielectric element to reach the second internal electrode on an outermost layer;
a first inner columnar electrode which is connected to all the first internal electrodes while passing through the second internal electrodes and which has a cross-sectional area larger than a cross-sectional area of each of the first and second outer columnar electrodes;

a second inner columnar electrode which is connected to all the second internal electrodes while passing through the first internal electrodes and which has a cross-sectional area larger than a cross-sectional area of each of the first and second outer columnar electrodes;

first external electrodes connected to the first outer columnar electrode; and second external electrodes connected to the second outer columnar electrode, wherein the first external electrodes and the second external electrodes are both arranged in an island form on the surface of the dielectric element while being adjacent to each other.

16. The multilayer capacitor according to claim 15, wherein a diameter of each of the first inner columnar electrode and second inner columnar electrode is two to four times as large as a diameter of each of the first outer columnar electrode and second outer columnar electrode.

17. The multilayer capacitor according to claim 15, wherein a diameter of each of the first inner columnar electrode and second inner columnar electrode is 150 $\mu$m to 200 $\mu$m, and a diameter of each of the first outer columnar electrode and second outer columnar electrode is 50 $\mu$m to 80 $\mu$m.

18. The multilayer capacitor according to claim 15,
wherein the plural first outer columnar electrodes and the plural second outer columnar electrode are provided, and wherein the first external electrodes in the number corresponding to the number of the first outer columnar electrodes are disposed on the surface of the dielectric element, and the second external electrodes in the number corresponding to the number of the second outer columnar electrodes are disposed on the surface of the dielectric element.

19. The multilayer capacitor according to claim 15, wherein the plural first inner columnar electrodes and the plural second inner columnar electrodes are provided in the dielectric element.

20. The multilayer capacitor according to claim 15, wherein the plural first inner columnar electrodes are disposed around the first outer columnar electrode on the first internal electrode, and the plural second inner columnar electrodes are disposed around the second outer columnar electrode on the second internal electrode.

* * * * *